United States Patent
Liu et al.

(10) Patent No.: US 7,067,615 B1
(45) Date of Patent: Jun. 27, 2006

(54) HYDROTREATING POLYESTER PRECURSORS

(75) Inventors: Zhufang Liu, Kingsport, TN (US); Jeff Scott Howell, Johnson City, TN (US); Charles Edwan Sumner, Jr., Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 11/151,085

(22) Filed: Jun. 13, 2005

(51) Int. Cl.
*C08F 6/00* (2006.01)

(52) U.S. Cl. ............... 528/480; 502/150; 528/481; 564/450; 564/451; 568/816; 568/834; 568/862; 568/863

(58) Field of Classification Search ............ 502/150; 528/480, 481; 564/450, 451; 568/816, 834, 568/862, 863
See application file for complete search history.

(56) References Cited

U.S. PATENT DOCUMENTS

| | | |
|---|---|---|
| 3,487,100 A | 12/1969 | Yano et al. |
| 3,497,477 A | 2/1970 | Barkey et al |
| 3,501,420 A | 3/1970 | Stevenson |
| 3,647,362 A | 3/1972 | Head et al. |
| 4,506,091 A | 3/1985 | Deardorff |
| 4,609,634 A | 9/1986 | King, Jr. |
| 5,545,746 A | 8/1996 | Benzaria et al. |
| 5,550,264 A | 8/1996 | Elsasser |
| 5,936,126 A * | 8/1999 | Ruhl et al. ............ 564/451 |
| 6,380,352 B1 | 4/2002 | Sumner, Jr. et al. |

FOREIGN PATENT DOCUMENTS

| | | |
|---|---|---|
| EP | 942070 (ABS) | 9/1999 |
| JP | 50142537 | 11/1975 |
| JP | 3264553 (ABS) | 11/1991 |
| JP | 7227710 (ABS) | 8/1995 |
| JP | 1995258588 | 10/1995 |
| JP | 1995308507 | 11/1995 |
| JP | 1997173833 | 7/1997 |
| JP | 2000034343 (ABS) | 2/2000 |
| WO | WO 96/02618 | 2/1996 |
| WO | WO 02/12380 | 2/2002 |

OTHER PUBLICATIONS

Kruger, Reisener, Reuter, Richter, Metallurgy, Institut fur Metallbuttenwesen und Elektrometallurgie, Rheinisch-Estfalische Technische Hochshule Aachen, Federal Republic of Germany, pp. 375-387, vol. A16.

Biskup, Subotic, Removal of Heavy-Metal Ions from Solutions by Means of Zeolites.ll. Thermodynamics of the Exchange Processes Between Zinc and Lead Ions from Solutions and Sodium Ions from Zeolite A, Separation Science and Technology, 2000, pp. 2311-2326, 35(14), Marcel Dekker, Inc.

Valverde, Lucas, Gonzalez, Rodriguez, Equilibrium Data for the Exchange of $Cu^{2+}$, $Cd^{2+}$, and $Zn^{2+}$ Ions for H+ on the Cationic Exchanger Amberlite IR-120, J. Chem. Eng. Data, 2002, pp. 613-617, issue 47, American Chemical Society on the web.

Streat, Adsorption of Trace Metals on Modified Activated Carbons, Dept. of Chemical Engineering, Loughborough University of Technology, pp. 264-271.

Vernon, Metal separation by chelating ion exchange, Acta Polymerica 30, 1979, pp. 740-743, University of Salford, Dept. of Chemistry and Applied Chemistry, Salford M5 4WT, Lane, (U.K.).

Waitz, Jr., Ion Exchange for Recovery of Precious Metals, Plating and Surface Finishing, 1982, pp. 56-59.

Co-pending U.S. Appl. No. 11/151,084, filed Jun. 13, 2005.

* cited by examiner

*Primary Examiner*—Terressa Boykin
(74) *Attorney, Agent, or Firm*—Bernard J. Graves, jr.; Dennis V. Carmen

(57) ABSTRACT

A process comprising contacting a liquid polyester stream with hydrogen in the presence of a hydrogenation catalyst comprising a metal supported on the surface of silicon carbide at a metal dispersion of at least 0.5% or graphite at a metal dispersion of at least 10% to produce a treated liquid polyester stream. The treated stream may be polycondensed in the presence of a polycondensation catalyst to produce a polyester polymer having an It.V. of at least 0.55 dL/g. The liquid polyester stream desirably has a composition comprising:

a) terephthalic acid residues, isophthalic acid residues, and/or naphthalenedicarboxylic acid residues and b) an average degree of polymerization of 0.5 to 20 and c) an acid number ranging from 5 to 600.

31 Claims, No Drawings

HYDROTREATING POLYESTER PRECURSORS

1. FIELD OF THE INVENTION

This invention pertains to a process of hydrogenating a polyester oligomer containing terephthalic acid residues wherein terephthalic acid residues are converted to residues of 1,4-cyclohexanedicarboxylic acid. This invention also pertains to a process for the preparation of polyesters containing 1,4-cyclohexanedicarboxylic acid residues by first hydrogenating a polyester oligomer containing terephthalic acid residues with an acid number ranging from 5 to 600 over a hydrogenation catalyst surface supported on a silicon carbide or graphite support to improve the effective contact surface area and minimize mass transfer effects, and then reacting the resulting oligomer with one or more polyester-forming reactants to produce a higher molecular weight polyester with reduced b* color.

2. BACKGROUND OF THE INVENTION

Polyesters comprising terephthalic acid and ethylene glycol residues and residues of one or more saturated dicarboxylic acids comprise a growing market of specialty polyesters. The incorporation of a saturated comonomer such as 1,4-cyclohexanedicarboxylic acid (CHDA) into the polyethylene terephthalate (PET) framework can impart desirable properties, e.g., slower crystallization rates, to the resulting polyester. Copolyesters normally are prepared by reaction of a purified dicarboxylic acid such as CHDA and diols under polymerizing conditions. Coployesters derived from CHDA or a diester therof are significantly more expensive due to the cost of the CHDA monomer. For example, 1,4-CHDA normally is prepared commercially from terephthalic acid (TPA) by the ruthenium-catalyzed hydrogenation of the disodium salt of TPA, followed by neutralization and separation of the resulting CHDA from aqueous sodium salts. The present invention provides a process for the production of copolyesters containing CHDA residues by the hydrogenation of polyester oligomers containing TPA residues.

Hydrogenation processes of involving terephthalic acid esters derived from poly(ethylene terephthalate) are known. U.S. Pat. No. 3,501,420 discloses the depolymerization of waste poly(ethylene terephthalate) in an alcohol to give a solution of terephthalic acid esters. The resulting solution is hydrogenated to remove color bodies. In this process, poly (ethylene terephthalate) is converted to primarily monomeric esters before contact with hydrogen. The decolorized solution of TPA esters may be used to prepare high-quality poly(ethylene terephthalate).

U.S. Pat. No. 3,487,100 discloses that bis-hydroxyethyl terephthalate (BHET) prepared from crude TPA and ethylene glycol may be decolorized by treatment with hydrogen in the presence of a hydrogenation catalyst. The BHET is dissolved in water and filtered to remove oligomeric species (which are insoluble in water). The filtered solution is treated with hydrogen at a temperature range of 50–100° C. Although the hydrogenation treatment reduces fluorenone impurities, the BHET must be in solution and the product must be crystallized from solution before further use. Another disadvantage is that polyester oligomers cannot be processed by this method.

Japanese Kokai JP 50-142537 discloses a process to produce cyclohexanedimethanol (CHDM) by the depolymerization and hydrogenation of waste poly(ethylene terephthalate). In this process, waste PET is depolymerized with a 7-fold excess of ethylene glycol in the presence of hydrogen and a hydrogenation catalyst to convert poly (ethylene terephthalate) into a solution of ethylene glycol esters of cyclohexanedicarboxylic acid. The product of this step is separated from the catalyst and treated again with hydrogen at high pressure in the presence of a second hydrogenation catalyst. The object of the second step is to convert the esters of cyclohexanedicarboxylic acid into a solution of CHDM.

U.S. Pat. No. 6,380,352 discloses a process to remove colored impurities from oligomers produced from crude terephthalic acid and ethylene glycol by passing the oligomers over a hydrogenation catalyst. These oligomers have a degree of polymerization of 2 to 20 (preferably 3 to 5) and b* value of 4 to 7. The hydrogenation catalysts are composed of the platinum group metal supported on zirconia, or carbon, or silica, or alumina, or zeolites, or their mixtures. The process is preferably operated at 240 to 270° C. and 150 to 400 psig.

3. SUMMARY OF THE INVENTION

We have developed a process whereby a polyester oligomer composition, i.e., a low molecular weight polyester, comprising residues of TPA and one or more diols may be hydrogenated under a specific catalyst composition to improve the effective contact surface area between the oligomer composition and the catalyst and to minimize the mass transfer effects.

Accordingly, one embodiment of the present invention is a process wherein a liquid polyester stream is contacted with hydrogen in the presence of a hydrogenation catalyst comprising a metal supported on the surface of silicon carbide at a metal dispersion of at least 0.5% or graphite at a metal dispersion of at least 10%.

The process of the invention advantageously reduces the b* color of the polyester stream. The liquid polyester stream preferably comprises:

a) terephthalic acid residues, isophthalic acid residues, and/or naphthalenedicarboxylic acid residues and b) has an average degree of polymerization of 0.5 to 20 and c) has an acid number ranging from 5 to 600

A second embodiment of the present invention is a process comprising:

(1) contacting a liquid oligomer stream, having a degree of polymerization ranging from 1.5 to less than 7, with hydrogen in the presence of a hydrogenation catalyst comprising a metal supported on the surface of silicon carbide at a metal dispersion of at least 0.5% or graphite at a metal dispersion of at least 10% to produce a treated liquid polyester stream, and (2) polycondensing the treated oligomer stream in the presence of a polycondensation catalyst to produce a polyester polymer having an It.V. of at least 0.55 dL/g.

The oligomer stream preferably has a composition comprising:

a) terephthalic acid residues, isophthalic acid residues, and/or naphthalenedicarboxylic acid residues and b) has an average degree of polymerization of 1.5 to 7 and c) has an acid number ranging from 5 to 600.

The present invention offers a more economical means for preparing copolyesters having reduced b* color and containing terephthalic acid residues and CHDA residues in the polymer chain. The resulting oligomer comprised of comonomers may be polymerized by conventional means to produce copolyesters of saturated and unsaturated monomers. The polyesters which may be obtained in accordance with the present invention have a variety of uses such as adhesives, food packaging and coating compositions.

4. DETAILED DESCRIPTION OF THE INVENTION

The present invention may be understood more readily by reference to the following detailed description of the invention. It is to be understood that this invention is not limited to the specific processes and conditions described, as specific processes and/or process conditions for processing plastic articles as such may, of course, vary.

It must also be noted that, as used in the specification and the appended claims, the singular forms "a", "an" and "the" include plural referents. References to a composition containing "an" ingredient or "a" polymer is intended to include other ingredients or other polymers, respectively, in addition to the one named.

Ranges may be expressed herein as "within" or "between" or from one value to another. In each case, the end points are included in the range. Ranges expressed as being greater than or less than a value exclude the end point(s).

By "comprising" or "containing" or "having" is meant that at least the named compound, element, particle, or method step etc must be present in the composition or article or method, but does not exclude the presence of other compounds, materials, particles, method steps, etc, even if the other such compounds, material, particles, method steps etc. have the same function as what is named.

It is also to be understood that the mention of one or more method steps does not preclude the presence of additional method steps or intervening method steps between those steps expressly identified.

The It.V. values described throughout this description are set forth in dL/g units as calculated from the inherent viscosity measured at 25° C. in 60/40 wt/wt phenol/tetrachloroethane. The inherent viscosity is calculated from the measured solution viscosity. The following equations describe such solution viscosity measurements and subsequent calculations to Ih.V. and from Ih.V. to It.V:

$$\eta_{inh}=[ln(t_s/t_o)]/C$$

where $\eta_{inh}$=Inherent viscosity at 25° C. at a polymer concentration of 0.50 g/100 mL of 60% phenol and 40% 1,1,2,2-tetrachloroethane ln =Natural logarithm $t_s$=Sample flow time through a capillary tube $t_o$=Solvent-blank flow time through a capillary tube C=Concentration of polymer in grams per 100 mL of solvent (0.50%)

The intrinsic viscosity is the limiting value at infinite dilution of the specific viscosity of a polymer. It is defined by the following equation:

$$\eta_{int}=\lim_{C\to 0}(\eta_{sp}/C)=\lim_{C\to 0}ln(\eta_r/C)$$

where $\eta_{int}$=Intrinsic viscosity $\eta_r$=Relative viscosity =$t_s/t_o$ $\eta_{sp}$=Specific viscosity=$\eta_r$−1

Instrument calibration involves replicate testing of a standard reference material and then applying appropriate mathematical equations to produce the "accepted" I.V. values.

Calibration Factor=Accepted IV of Reference Material/Average of Replicate Determinations Corrected IhV=Calculated IhV×Calibration Factor The intrinsic viscosity (ItV or $\eta_{int}$) may be estimated using the Billmeyer equation as follows:

$$\eta_{int}=0.5[e^{0.5\times Corrected\ IhV}-1]+(0.75\times Corrected\ IhV)$$

In a first embodiment, a liquid polyester stream is contacted with hydrogen in the presence of a hydrogenation catalyst comprising a metal supported on the surface of silicon carbide at a metal dispersion of at least 0.5% or graphite at a metal dispersion of at least 10%.

The liquid polyester stream is liquid under the contact conditions with hydrogen. The polyester stream can be a molten stream at elevated temperatures which is otherwise a solid at room temperature and atmospheric pressure, or it can be a liquid at room temperature and atmospheric pressure. The stream, in any case, should be liquid under the reaction conditions to have a flow over the catalyst.

The polyester stream can be a monomer stream having an average degree of polymerization of at least 0.5 up to about 1.5, or an oligomer stream which typically has an average degree of polymerization ranging from about 1.5 to less than 7.0, or a prepolymer or molten polyester precursor stream having an average degree of polymerization from 7.0 up to about 20. The degree of polymerization (DP) is defined as the number average molecular weight of the oligomer (determined by gel permeation chromatography (GPC)) divided by the molecular weight of the repeat unit.

The method for making the liquid polyester stream composition is not limited, and any conventional technique is suitable. For ease of discussion, reference will be made to the use of terephthalic acid and ethylene glycol as illustrative starting compounds, although it is to be understood that isophthalic acid and naphthalene dicarboxylic acid are also useful starting materials as well as other diol species.

An oligomer stream composition typically is produced by esterifying terephthalic acid, or a diester thereof such as dimethyl terephthalate, with one or more diols such as ethylene glycol, diethylene glycol, 1,3-butanediol, 1,4-cyclohexanedimethanol, and the like. The product of the esterification reaction is an oligomer mixture having an average degree of polymerization (DP) of about 0.5 to less than 7.0, preferably about 2 to 5.

In one embodiment, the oligomers may be characterized by the general formula:

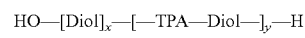

wherein Diol is a divalent residue of a diol or glycol component such as ethylene glycol, diethylene glycol, 1,2- and 1,3 propanediol, 2-methyl-1,3-propanediol, 2,2-dimethyl-1,3-propanediol, 1,4-butanediol, 1,4-cyclohexanedimethanol, and the like, preferably ethylene glycol, TPA is the divalent residue of terephthalic acid, x is 0 or 1, and y has an average value of about 0.5 to 20. While the TPA is the divalent residue of terephthalic acid in this formula, the TPA-Diol repeat unit may be obtained by either esterifying TPA with a Diol or transesterifying DMT or other alkyl ester of TPA with a Diol such as dimethylterephthalate.

In the process of the invention, water is not added to the oligomer composition stream. While water is naturally present in and a byproduct of the esterification reaction, additional amounts of water are not added to dilute the oligomeric stream.

The liquid polyester stream comprising an oligomer composition may be prepared using crude terephthalic acid, purified terephthalic acid, or a polyester-forming derivative such as dimethyl terephthalate. Crude terephthalic acid (CTA), prepared by the oxidation of para-xylene, typically contains 4-carboxybenzaldehyde (CBA) as the major impurity and minor but significant amount of colored impurities. The colored impurities have been identified as a mixture of mainly dicarboxyfluorenone isomers (with lesser amounts of mono- and tri-carboxyfluorenones) and dicarboxybenzyl. These highly-colored carboxyfluorenone compounds may be hydrogenated to colorless carboxyfluorene compounds. Other compounds such as dicarboxybenzophenone and dicarboxybiphenyl have been identified in low concentrations. Although essentially any grade of CTA can be used in the preparation of the oligomers employed as the starting material for the process of the present invention, the CTA used typically contains less than about 4000 ppm of CBA, preferably less than 700 ppm CBA, and most preferably from about 50 to 250 ppm CBA.

CTA typically is reacted with at least one diol in an esterification zone operated at a temperature of between about 200° C. and 300° C., and at a super-atmospheric pressure of between about 1 psig up to about 400 psig, or from 1 psig to 200 psig, or from 1 psig to 70 psig. The residence time of the reactants typically ranges from between about one and five hours. Normally, the dicarboxylic acid is directly esterified with diol(s) at elevated pressure and at a temperature of about 240° C. to about 285° C.

The esterification reaction is continued until a degree of esterification of at least 70% is achieved, but more typically until a degree of esterification of at least 85% is achieved to make the desired oligomeric mixture (or otherwise also known as the "monomer"). The esterification reaction typically takes about 1 to 4 hours. The reaction to make the oligomeric mixture is typically uncatalyzed in the direct esterification process and catalyzed in ester exchange processes. An antimony containing catalyst or other polycondensation catalyst may optionally be added in the esterification zone along with raw materials. Typical ester exchange catalysts which may be used in an ester exchange reaction between dialkylterephthalate and a diol include titanium alkoxides and dibutyl tin dilaurate, zinc compounds, manganese compounds, each used singly or in combination with each other. Any other catalyst materials well known to those skilled in the art are suitable.

The resulting oligomeric mixture formed in the esterification zone (which includes direct esterification and ester exchange processes) includes bis(2-hydroxyethyl)terephthalate (BHET) monomer, low molecular weight oligomers, DEG, and trace amounts of water as the condensation by-product not removed in the esterification zone, along with other trace impurities from the raw materials and/or possibly formed by catalyzed side reactions, and other optionally added compounds such as toners and stabilizers. The relative amounts of BHET and oligomeric species will vary depending on whether the process is a direct esterification process in which case the amount of oligomeric species are significant and even present as the major species, or a ester exchange process in which case the relative quantity of BHET predominates over the oligomeric species. Water is removed as the esterification reaction proceeds to drive the equilibrium toward the desired products. The oligomer composition typically has a b* value of at least 3, and the process of the invention is particularly well adapted to reduce the b* color of oligomeric compositions having a b* of at least 4, or at least 5, or at least 7, as determined using a Hunterlab UltraScan XE Spectrocolorimeter in a reflectance mode or its equivalent based on the CIE L*, a*, b*.

The process of the invention is effective at reducing the b* color of oligomeric streams having a b* color value up to 12 to a level which is suitable for many applications, such as bottle applications.

The liquid polyester stream preferably comprises:
  a) terephthalic acid residues, isophthalic acid residues, and/or naphthalenedicarboxylic acid residues and
  b) has an average degree of polymerization of 0.5 to 20 and
  c) has an acid number ranging from 5 to 600

The oligomeric composition stream preferably has an acid value ranging from 5 to 600 as determined by milligrams of KOH consumed per gram of the oligomeric composition in an acid-base titration. The more preferred acid number is in a range from 100 to 300. The acid value can be adjusted by controlling the ratio of acid to glycol in the esterification reaction. TPA/EG molar ratio ranging from 1 to 0.2 may generate high acid numbers in the range of 100 to 300 at a DP ranging from 0.5 to 6. The acid number can also be adjusted by controlling the DP, with higher DP leading to lower acid numbers as more of the acid end groups react. However, it is also possible to produce an oligomer stream with a low DP and also a low acid number if the acid end groups are capped with ethylene glycol under conditions which does not promote polycondensation reactions among the monomer or oligomer units. Oligomeric streams with an acid value lower than 5 are not suitable because it indicates that either the DP is too high to economically process the highly viscous material through a catalyst bed, or the level of diol is too high, thereby hindering the efficient molecular weight build up and requiring the removal of the excess diol. Liquid polyester streams having an acid number higher than 600 are not suitable because a high amount of terephthalic acid remains undissolved under typical esterification conditions. To dissolve the terephthalic acid, the esterification and the hydrogenation reaction will have to be conducted at excessively high temperature and high pressure to keep terephthalic acid dissolved.

The oligomeric product of the esterification zone typically comprises monomer and oligomer species, if any. The oligomer stream may be made continuously in a series of one or more reactors. Alternately, the monomer and oligomer species in the oligomeric mixture could be produced in one or more batch reactors. It is understood, however, that in a process for making PEN, the reaction mixture will contain the monomeric species bis 2,6-(2-hydroxyethyl) naphthalate and its corresponding oligomers. At this stage, the It.V. is usually not measurable or is less than 0.1. The average degree of polymerization of the oligomeric stream is generally from 1.5 to less than 7.0.

While reference is made here to the DP of an oligomeric stream, the process is also useful to hydrogenate a monomer stream having an average DP of less than 1.5 and comprising the reaction products of a diol with a dicarboxylic acid (TPA, IPA, NDA, etc.), or molten polymer streams having an average DP of 7.0 or more and up to 20 such as prepolymer streams and finished streams and degraded post consumer recycled polyester polymers, where the It.V. usually ranges from 0.1 to 0.60 dL/g. An average degree of polymerization above 20 is not suitable because it is too viscous, and an average degree of polymerization below 0.5 are not suitable because esterification reactions have not occurred to a substantial degree.

Recent developments making it possible to melt phase polycondense polyester polymers to high It.V. values ranging from 0.60 to 0.85 dL/g also make it possible to pass the molten polymer over a catalyst bed, but this is not practical because one would have to revert from vacuum pressure conditions in the finisher to high pressure in the hydrogenation zone to force the viscous material through a catalyst bed. Thus, a preferred liquid polyester stream has an It.V. of 0.45 It.V. of less, or more preferred are those having an It.V. of 0.30 dL/g or less, because the streams are sufficiently fluid to readily flow across the catalyst bed while employing moderate pressure of less than 400 psig.

Once the oligomeric composition is made to the desired degree of esterification, it is transported from the esterification zone or reactors to the polycondensation zone in step b). However, prior to proceeding to the polycondensation zone, the molten oligomeric composition stream if fed to a hydrogenation zone in which the oligomeric stream contacts hydrogen in the presence of a hydrogenation catalyst comprising a metal supported on the surface of silicon carbide at a metal dispersion of at least 0.5% or graphite at a metal dispersion of at least 10%.

Suitable metals used to hydrogenate the terephthalic acid residues and reduce the b* color of the oligomer stream include any conventional metal known to hydrogenate. Examples of the hydrogenation catalysts which may be used include the platinum group metals, such as ruthenium, rhodium, palladium, platinum and osmium. Nickel also may be used. Preferred hydrogenation metal catalysts include palladium, platinum and nickel catalysts.

With changing reaction conditions (e.g., increasing pressure), the conversion of the aromatic rings to alicyclic rings from 0% to 50% may be achieved. The degree of the conversion may depend on the required property of the final products. The method for detecting the presence of hydrogenated rings is by methanolysis; i.e., a sample of the treated oligomer is first degraded by methanolysis and then both GC and LC are used to determine whether dimethyl cyclohexanecarboxylate (DMCD)—the product of the hydrogenated aromatic ring—is present. Other equivalent methods may also be employed.

The metals are loaded on the catalyst support. The catalyst support used in the invention is silicon carbide or graphite. These catalyst supports have larger pore sizes than other supports such as carbon. With a larger pore size, the mass transfer effects are minimized because the oligomeric molecule can more easily/quickly penetrate the pore to the site of the metal catalyst within the pore and exit the pore than is the case with smaller pore sizes which may inhibit access to the metal site to such an extent that the conversion rate relative to the LHSV of the stream is too slow. Thus, with a larger pore size, the effective number of metal contact sites are increased, thereby increasing the rate at which the liquid polyester stream is converted to hydrogenated residues.

The average pore diameter in the support preferably is within a range of 0.8 to 40 nm, and the pore volume is desirably within a range of 0.1 to 0.8 cc/g.

The catalyst utilized in the hydrogenation reaction is also desirably loaded onto the surface of the support as much as possible while attempting to minimize the number of metal atoms penetrating toward or slightly below the pore openings and further minimizing the penetration of metal deep into the pores. The catalyst utilized has a metal dispersion of at least 10% on the surface of graphite or at least 0.5% on the surface of silicon carbide. The metal dispersion is the moles of metal atoms exposed to the surface divided by the total moles of metal atoms loaded multiplied by 100. Reducing metal diffusion into the pores when loaded onto the support such that the dispersion is at least 10% % on the surface of graphite or at least 0.5% on the surface of silicon carbide while utilizing a type of support which has large pore diameters results in a reduction of mass transfer effects, increasing the conversion rate, and/or decreasing the amount of metal which must be loaded on the support to obtain a desired conversion rate.

Dispersions less than 10% on graphite or less than 0.5% on silicon carbide require additional metal loading to provide sufficient contact sites at the desired polyester stream LHSV. Preferably, the dispersion of the metal on the support is at least 15% on graphite or at least about 1% on silicon carbide. By "about" is meant that the target amount is 1% but leaves room for variability in manufacturing processes and analytical error.

Suitable hydrogenation catalysts using silicon carbide or graphite supports are commercially available from Engelhard Corporation.

The catalysts are generally in the form of pellets rather than particles. The average diameter of the pellets is typically within the range of $\frac{1}{16}$" to $\frac{3}{8}$".

The silicon carbide or graphite supports contains from 0.1 wt. % up to about 10 wt. % of metal dispersed on the support, based on the combined weight of the support and the metal. Since on graphite the dispersion is at least 10%, or preferably at least 15%, or more preferably at least 20%, the amount of metal loaded on the support can be relatively low, preferably in the range of 0.1 wt. % to 5 wt. %, more preferably from 0.5 wt. % to 2 wt. %.

The oligomer composition fed to the hydrogenation zone typically has a b* color above 3, or 4 or more, or 5 or more, or 7 or more, and after hydrogenation, has a b* color value reduced by at least 35%, or at least 50%, or at least 65%. b* reductions of 3 or more b* units, or 4 or more b* units are attainable. In many instances, final b* values of less than about 3, preferably less than about 2.5 are attainable. Preferably, the treated oligomer stream also contains less than 250 ppm CBA. The process conditions of the invention desirably are effective to reduce the b* color of the oligomeric composition, and preferably by the aforementioned amounts. The process conditions are more preferably effective to also convert at least 1 mole percent, more typically from about 10 to 50 mole percent, of the terephthalic acid residues present in the oligomeric mixture to 1,4-cyclohexanedicarboxylic acid residues.

Suitable reaction conditions include contacting the oligomeric stream with the hydrogenation catalyst at a temperature of 150 to 300° C. (depending upon the content of ethylene glycol), a pressure on the oligomer stream in the range of about 20 psig to 2500 psig, a hydrogen gas hourly space velocity of 6 to 1000 hour$^{-1}$, and an oligomer stream liquid hourly space velocity ranging from 0.2 to 40 hour$^{-1}$. The preferred conditions comprise temperatures in the range of about 240 to 280° C., a low pressure on the oligomer stream ranging from 20 psig to 300 psig, LHSV ranging from 1 to 15, and a GHSV ranging from 100 to 400. Suitable hydrogenation residence time, which is the time the oligomer stream contact hydrogen in the presence of the hydrogenation catalyst, ranges from 0.5 minutes up to about three hours. It should be appreciated that hydrogenation times will vary with the amount and activity of the catalyst selected as well as the pressure and mode of operation.

By hydrogenating a molten polyester stream rather than a crude terephthalic acid stream, the acidity is lowered thereby avoiding the use of special metallurgy (titanium vessels), and the process conditions are more moderate. Typical overall pressure required to hydrogenate a CTA stream may exceed 1000 psig, while an oligomer stream can be hydrogenated at more moderate pressures of less than 400 psig, or even less than 300 psig. Moreover, it is not necessary to dissolve the liquid polyester polymer stream in water prior to hydrogenation as is the case with conventional CTA hydrogenation processes. The process of the invention is also flexible in that a wide variety of feed sources can be employed, and these include monomer streams, oligomer streams, prepolymer streams, and even post consumer recycled polyester polymers which have been degraded to a lower DP through conventional techniques such as methanolysis or ethanolysis. Once the polyester polymer is degraded, the resulting liquid polyester stream may be hydrogenated and fed to a polycondensation reactor with or without virgin polyester polymers in the polycondensation zone. The average DP of degraded polyester streams ranges from 0.5 to 10, and they typically have an It.V. ranging from 0.1 to 0.5.

Another useful source of polyester polymers for hydrogenation according to the process of the invention includes feeding scrap virgin polyester polymers as a molten liquid to the hydrogenation zone or first degrading the polyester and feeding the degradation oligomeric and polymeric products through the hydrogenation zone.

The hydrogenation process may be carried out in a batch, semi-continuous or continuous mode of operation using a slurry or fixed bed of catalyst. The process preferably is carried out in a continuous mode of operation utilizing a trickle bed reactor wherein a melt of the oligomer flows over and through one or more beds of a supported hydrogenation catalyst at elevated temperature and pressure. The hydrogenation may be carried out in the presence of a diluent such as the diol, e.g., ethylene glycol, used in the preparation of the oligomer. The amount of diluent used may be in the range of about 5 to 50 weight percent based on the weight of the oligomer.

In the event that an oligomer stream is treated, it may be polymerized by conventional methods in a polycondensation zone to produce a polyester polymer in the melt phase. The composition and properties of the final polyester may be varied by reacting or polymerizing the hydrogenated oligomer mixture with other copolymerizable compounds or materials such as, for example, a polyester oligomer which has not been hydrogenated or has been hydrogenated under different conditions to give an oligomer product containing more or less 1,4-cyclohexanedicarboxylic acid residues. The hydrogenated oligomer mixture also may be reacted with dicarboxylic acids and/or diols different from those from which the oligomer is prepared.

The melt phase polymerization or polycondensation is conducted in conventional reactors, which are known in the art in continuous or batch modes. Suitable polycondensation catalysts include compounds of titanium, gallium, germanium, tin, antimony, aluminum, bismuth, silicon, zirconium, compounds of antimony, germanium, titanium or mixtures thereof are preferred. The amount of catalyst added is from about 5 to about 400 ppm and preferably between about 20 to about 300 ppm when germanium or antimony is used. The oligomer mixture undergoes melt-phase polycondensation to produce a precursor polymer which has an It.V. of at least 0.55 dL/g, and up to about 0.90 dL/g. The precursor polyester is produced in a series of one or more reactors operating at elevated temperatures. To facilitate removal of excess glycols, water, alcohols and other reaction products, the polycondensation reactors are run under a vacuum or purged with an inert gas. Inert gas is any gas that does not cause unwanted reactions or product characteristics. Suitable gases include, but are not limited to $CO_2$, argon, helium, and nitrogen.

The polyester product from the polycondensation reaction often is pelletized for ease of handling. For crystallizable polyesters, the polyester is then crystallized and optionally polymerized further in the solid state if the precursor It.V. is not sufficiently high, using equipment and conditions which are known in the art. However, crystallizable polyesters of the present invention may also be fed directly to molding equipment without pelletization or solid stating.

The hydrogenation process of the present invention normally is carried out on the oligomer which is formed in the process of making high molecular weight polyesters. However, it may be possible to utilize the present invention at other points in the polyester manufacturing process so long as the feed material to be hydrogenated is in a liquid form capable of being pumped through the selected hydrogenation reactor and contacting the catalyst to effect the desired reaction. For example, the hydrogenation feed also may be a prepolymer. The hydrogenation step may be performed as early as the first oligomer-forming reactor when a granular hydrogenation catalyst is used and as early as between the first and second oligomer-forming reactors using a fixed and/or trickle bed reactor. It may be possible to conduct the hydrogenation step between esterification and polycondensation, after polycondensation, or at any point in between. In embodiments wherein the selected polycondensation catalyst reacts with the hydrogenation catalyst it may be preferable to conduct the hydrogenation prior to adding the polycondensation catalyst.

The polyesters derived from the oligomers hydrogenated in accordance with the present invention include polyester homopolymers and copolymers that are suitable for use in a wide variety of applications including packaging, film, sheet, coatings, adhesives, molded articles and the like. Food packaging is a particularly preferred use for certain polyesters of the present invention, and particularly beverage bottle preforms and carbonated soft drink, water, and juice bottles produced thereby.

The polyesters preferably comprise a dicarboxylic acid residue component comprising 1,4-cyclohexanedicarboxylic acid residues and, optionally but preferably, one or more other dicarboxylic acids such as terephthalic acid and/or isophthalic acid and/or naphthalenedicarboxylic acid residues, preferably from about 1 to 50 mole percent 1,4-cyclohexane-dicarboxylic acid residues, and more preferably about 2 to 10 mole percent 1,4-cyclohexanedicarboxylic acid residues based on all the moles of acid residues and a diol residue component comprising residues of at least one diol such as the divalent residues of ethylene glycol, 1,4-cyclo-hexanedimethanol, diethylene glycol, butanediol and mixtures thereof in an amount ranging from 40 to 100 mole %, preferably from 85 or from 92 mole % to 100 mole % based on all the moles of polyhydroxyl functional compounds.

Suitable dicarboxylic acid comonomers include aromatic dicarboxylic acids preferably having 12 to 14 carbon atoms, or aliphatic dicarboxylic acids preferably having 4 to 12 carbon atoms. Examples of dicarboxylic acid comonomers which are used in minor amounts comprise terephthalic acid, phthalic acid, isophthalic acid, naphthalene-2,6-dicarboxylic acid, cyclohexanediacetic acid, diphenyl-4,4'-dicarboxylic acid, dipheny-3,4'-dicarboxylic acid, succinic acid, glutaric acid, adipic acid, azelaic acid, sebacic acid, mixtures thereof and the like.

Suitable diol comonomers used in minor amounts comprise cycloaliphatic diols preferably having 6 to 20 carbon atoms or aliphatic diols preferably having 2 to 20 carbon atoms. Examples of such diols comprise ethylene glycol, triethylene glycol, propane-1,3-diol, butane-1,4-diol, pentane-1,5-diol, hexane-1,6-diol, neopentyl glycol, 3-methylpentane-2,4-diol, 2-methyl-1,4-pentanediol, 2,2,4-trimethylpentane-diol-(1,3), 2-ethylhexane-1,3-diol, 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4 tetramethylcyclobutanediol, 2,2-bis-(3-hydroxyethoxyphenyl)-propane, 2,2-bis-(4-hydroxypropoxyphenyl)-propane, isosorbide, hydroquinone, mixtures thereof and the like. Polyesters may be prepared from two or more of the above diols.

The polyesters of the present invention may also contain small amounts of trifunctional or tetrafunctional comonomers such as trimellitic anhydride, trimethylolpropane, pyromellitic dianhydride, pentaerythritol, and other polyester forming polyacids or polyols generally known in the art. Also, although not required, additives normally used in polyesters may be used if desired. Such additives include, but are not limited to colorants, toners, pigments, carbon black, glass fibers, fillers, impact modifiers, antioxidants, stabilizers, flame retardants, reheat aids, acetaldehyde reducing compounds, oxygen scavenging compounds, barrier improving additives, such as platelet particles and the like. The polyesters derived from the oligomers hydrogenated in accordance with the present invention preferably are produced by polymerizing the hydrogenated oligomer mixture and are comprised of:
(i) diacid residues comprising 1,4-cyclohexanedicarboxylic acid residues and at least 80 mole %, or at least 90 mole % terephthalic acid residues based on all moles of acid residues; and
(ii) diol residues comprising at least 80 mole %, or at least 92 mole %, ethylene glycol residues based on all the moles of polyfunctional hydroxyl compound residues.

As used in the specification and concluding claims, residue refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH$_2$CH$_2$O— repeat units in the polyester, regardless of whether ethylene glycol is used to prepare the polyester. Similarly, a sebacic acid residue in a polyester refers to one or more —CO(CH$_2$)$_8$CO— moieties in the polyester, regardless of whether the residue is obtained by reacting sebacic acid or an ester thereof to obtain the polyester. Likewise a terephthalic acid residue may be derived from terephthalic acid or DMT since each contain the moiety

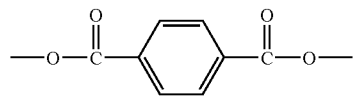

in the monomer, oligomer, or polymer.

Copolymers of isophthalic acid and 1,3-cyclohexanedicarboxylic acid may be produced from crude isophthalic acid without first producing purified 1,3-cyclohexanedicarboxylic acid since isophthalic acid also may be converted to the corresponding cyclohexanedicarboxylic acid by the hydrogenation treatment. Similar processing steps are removed or avoided for the 1,3-cyclohexanedicarboxylic acid process as described in the 1,4-cyclohexanedicarboxylic acid process. Thus, another embodiment of the present invention concerns a process comprising contacting a polyester oligomer comprising isophthalic acid (IPA) residues with hydrogen in the presence of a supported hydrogenation catalyst whereby at least 1 mole percent, preferably about 10 to 50 mole percent, of the isophthalic acid residues are converted to 1,3-cyclohexanedicarboxylic acid residues. The preferred conditions and oligomers, wherein the terephthalic acid reisudes are replaced with isophthalic acid residues, described above may be used in the process of hydrogenating a polyester oligomer comprising isophthalic acid residues to convert at least 1 mole percent, preferably about 10 to 50 mole percent, of the isophthalic acid residues to 1,3-cyclohexanedicarboxylic acid residues.

EXAMPLES

The processes provided by the present invention are further illustrated by the following examples. Unless specified otherwise, all percentages given in the examples are by weight.

Example 1

A PET oligomer was prepared by the reaction of ethylene glycol and CTA in a 1.3/1 mole ratio at 260° C. for 2 hours. The oligomer had b* color value of 8.8 as measured using the CIE L*, a*, b* Color Scale on a Hunter Ultra Scan 8000 spectrometer, and an acid number of 164.

150 g of 1% Pd supported on silicon carbide (1/16″ granules) was obtained from Engelhard Corporation. The Pd metal dispersion was measured with carbon monoxide at 30° C. over a MicromeriticsASAP 2000 chemisorption unit. The metal dispersion was determined to be 1.2% with carbon monoxide to Pd molar ratio of 2. This catalyst was loaded in a stainless steel reactor with 1″ OD and 20″ length. Then the reactor was heated to 260° C. at a heating rate of 10° C./minute through an aluminum heating block covered with band heaters in flowing nitrogen and then hydrogen at the GHSV of 60. Then, the reactor was gradually pressurized to 150 psig with hydrogen. Then, the oligomer was fed to the reactor with an extruding pump at the LHSV of 1.8. After the hydrotreating, the color of the precursor was significantly improved to a final b* of 5.1, representing a reduction in 3.7 b* units.

102 ppm of alicyclic rings was detected in the products.

Example 2

150 g of 0.5% Pd supported on silicon carbide (the same catalyst as in Example 1) was loaded in the 1″ OD stainless steel reactor. Then the reactor was heated to 260° C. in flowing nitrogen and then hydrogen at a rate of 60 GHSV. Then, the reactor was gradually pressurized to 150 psig with hydrogen. Then, a polyester precursor made of CTA and ethylene glycol with acid number of 159 and b* of 8.2 was fed to the reactor with an extruding pump at a rate of 1.8 LHSV. After the hydrotreating, the color of the precursor was significantly improved to a final b* of 4.8, representing a reduction of 3.4 b* units. 265 ppm of the alicyclic rings was present in the final products.

Example 3

150 g of 1% Pd supported on silicon carbide was loaded in a 1″ OD stainless steel reactor. Then the reactor was heated to 260° C. in flowing nitrogen and then hydrogen at a rate of 60 GHSV. Then, the reactor was gradually pressurized to 150 psig. Then, polyester precursor made of CTA and ethylene glycol with acid number of 593 and b* of 3.9 was fed to the reactor with an extruding pump at a rate of 1.8 LHSV. After the hydrotreating, the color of the precursor was significantly improved to a final b* of 1.9, representing greater than 50% reduction in b* color units. The average concentration of the alicyclic rings in the products was 0.1%.

Example 4

50 g of 2% Pd supported on graphite was loaded in a 1" OD stainless steel reactor. Then the reactor was heated to 260° C. in flowing nitrogen and then hydrogen at a rate of 60 GHSV. Then, the reactor was gradually pressurized to 150 psig. Then, polyester precursor made of CTA and ethylene glycol with acid number of 593 and b* of 3.9 was fed to the reactor with an extruding pump at a rate of 1.8 LHSV. After the hydrotreating, the color of the precursor was significantly improved to a final b* of 1.3. representing about a 66% reduction in b* color units. The average concentration of the alicyclic rings in the products was 1.1%.

Example 5

50 g of 1% Pd supported on graphite was loaded in a 1" OD stainless steel reactor. Then the reactor was heated to 260° C. in flowing nitrogen and then hydrogen at a rate of 60 GHSV. Then, the reactor was gradually pressurized to 150 psig. Then, polyester precursor made of CTA and ethylene glycol with acid number of 368 and b* of 5.2 was fed to the reactor with an extruding pump at a rate of 1.8 LHSV. After the hydrotreating, the color of the precursor was significantly improved to a final b* of 2.3, representing a reduction of greater than 50%. The average concentration of the alicyclic rings in the product was 2.0%.

Example 6

50 g of 0.5% Pd supported on graphite was loaded in a 1" OD stainless steel reactor. Then the reactor was heated to 260° C. in flowing nitrogen and then hydrogen at a rate of 60 GHSV. Then, the reactor was gradually pressurized to 150 psig. Then, polyester precursor made of CTA and ethylene glycol with acid number of 98 and b* of 10.7 was fed to the reactor with an extruding pump at a rate of 1.8 LHSV. After the hydrotreating, the color of the precursor was significantly improved to a b* of 4.4, representing a reduction of about 6.2 b* units. The average concentration of the alicyclic rings in the products was 0.7%.

Example 7

50 g of 0.5% Pd supported on graphite and promoted with 1000 ppm nickel was loaded in a 1" OD stainless steel reactor. Then the reactor was heated to 260° C. in flowing nitrogen and then hydrogen at a rate of 60 GHSV. Then, the reactor was gradually pressurized to 150 psig. Then, polyester precursor made of CTA and ethylene glycol with acid number of 249 and b* of 11.2 was fed to the reactor with an extruding pump at a rate of 1.8 LHSV. After the hydrotreating, the color of the precursor was significantly improved to a final b* of 7.1, representing a reduction of about 4.1 b* units. The concentration of the alicyclic rings in the products was 348 ppm.

The invention has been described in detail with particular reference to preferred embodiments thereof, but it will be understood that variations and modifications can be effected within the spirit and scope of the invention.

We claim:

1. A melt phase process for the manufacture of a polyester polymer comprising:
   (1) in the melt phase process for producing a polyester polymer, contacting a liquid polyester stream, having an average decree of polymerization of 0.5 to 20, with hydrogen in the presence of a hydrogenation catalyst comprising a metal supported on the surface of silicon carbide at a metal dispersion of at least 0.5% or graphite at a metal dispersion of at least 10% to produce a treated liquid polyester stream;
   (2) and polycondensing the treated oligomer stream to produce said polyester polymer.

2. The process of claim 1, wherein the liquid polyester stream, comprising an oligomeric stream, is contacted with hydrogen in the presence of the hydrogenation catalyst at a temperature of 150 to 300° C. under a pressure ranging from about 20 psig to 300 psig, a hydrogen gas hourly space velocity of 6 to 1000, and an oligomer stream liquid hourly space velocity ranging from 0.2 to 40.

3. The process of claim 2, wherein the temperature is in a range of 240° C. to 280° C., the liquid hourly space velocity ranges from 1 to 15, and a gas hourly space velocity ranges from 100 to 400.

4. The process of claim 1, wherein the metal is selected from the group consisting of ruthenium, rhodium, palladium, platinum, osmium and nickel.

5. The process of claim 4, wherein the metal is selected from the group consisting of palladium, platinum and nickel.

6. The process of claim 1, wherein the average pore diameter of the support is within a range of 0.8 to 40 nm.

7. The process of claim 6, wherein the pore volume is within a range of 0.1 to 0.8 cc/g.

8. The process of claim 6, wherein the metal dispersion is at least 15% on graphite or at least about 1% on silicon carbide.

9. The process of claim 1, wherein the metal dispersion is at least 15% on graphite or at least about 1% on silicon carbide.

10. The process of claim 1, wherein the hydrogenation catalyst is in the form of pellets having an average diameter within a range of 1/16" to 3/8".

11. The process of claim 1, wherein the metal dispersion is at least 15% on graphite or at least 1% on silicon carbide and the amount of metal loaded on the silicon carbide support ranges from 0.1 wt. % to 5 wt. %.

12. The process of claim 1, wherein the treated liquid polyester stream has a b* color value reduced by 3 or more units relative to the b* value of the liquid polyester stream.

13. The process of claim 1, wherein the b* color value of the treated polyester stream is reduced by at least 50% relative to the b* color value of the liquid polyester stream.

14. The process of claim 1, wherein the b* value of the liquid polyester stream is 5 or more and the final b* value of the treated liquid polyester stream is less than 2.5.

15. The process of claim 1, wherein the average DP of the liquid polyester stream ranges from 1.5 to less than 7.

16. The process of claim 1, wherein the average DP of the liquid polyester stream ranges from 7 to 20.

17. The process of claim 1, wherein the liquid polyester stream comprises post consumer recycled polyester polymer.

18. The process of claim 17, wherein the It.V. of the liquid Polyester stream is 0.45 dL/g or less.

19. The process of claim 1, wherein the liquid polyester composition comprises:
 a) terephthalic acid residues, isophthalic acid residues, and/or naphthalenedicarboxylic acid residues and
 b) having an average degree of polymerization of 0.5 to 20 and
 c) having an acid number ranging from 5 to 600.

20. The process of claim 19, wherein the liquid polyester composition comprises terephthalic acid residues, has an average degree of polymerization in a range of 1.5 to less than 7, and has an acid number in a range of 100 to 300.

21. The process of claim 1, wherein the liquid polyester polymer flows through a bed of the hydrogenation catalyst.

22. The process of claim 1, wherein the liquid polyester stream has a composition comprising an oligomer represented by the formula:

wherein Diol is a divalent residue of a diol component, TPA is the divalent residue of terephthalic acid, x is 0 or 1, and y has an average value of about 1.5 to less than 7.

23. The process according to claim 22 wherein Diol comprises a divalent residue of ethylene glycol and at least 1 mole percent of the terephthalic acid residues are converted to 1,4-cyclohexanedicarboxylic acid residues.

24. The process of any one of claims 1–23, wherein the support comprises silicon carbide, and the polyester polymer comprises residues of terephthalic acid.

25. The process of any one of claims 1–23, wherein the support comprises graphite, and the polyester polymer comprises residues of terephthalic acid.

26. The process of any one of claims 1–23, further comprising:
 (1) the liquid polyester stream comprises an oligomer stream having an average degree of polymerization in the range of 1.5 to less than 7, and
 (2) polycondensing the treated oligomer stream in the presence of a polycondensation catalyst to produce a polyester polymer having an It.V. of at least 0.55 dL/g.

27. The process of claim 26, wherein the support comprises silicon carbide.

28. The process of claim 26, wherein the support comprises graphite.

29. The process of claim 26, wherein the polyester polymer comprises:
 (i) diacid residues comprising 1,4-cyclohexanedicarboxylic acid residues and at least 80 mole % terephthalic acid residues based on all moles of acid residues; and
 (ii) diol residues comprising at least 80 mole % ethylene glycol residues based on all the moles of polyfunctional hydroxyl compound residues.

30. The process of claim 27, wherein the polyester polymer is further processed is molded into a bottle preform.

31. The process of claim 1, wherein the liquid polyester stream is esterified to a degree of esterification of at least 70% prior to contact with the hydrogen in the presence of a hydrogenation catalyst.

* * * * *

UNITED STATES PATENT AND TRADEMARK OFFICE
CERTIFICATE OF CORRECTION

| | | |
|---|---|---|
| PATENT NO. | : 7,067,615 B1 | Page 1 of 1 |
| APPLICATION NO. | : 11/151085 | |
| DATED | : June 27, 2006 | |
| INVENTOR(S) | : Liu et al. | |

It is certified that error appears in the above-identified patent and that said Letters Patent is hereby corrected as shown below:

Column 14, line 11, "an average decree" should be --an average degree--.

Signed and Sealed this

Ninth Day of January, 2007

JON W. DUDAS
*Director of the United States Patent and Trademark Office*